May 3, 1932. R. R. BLOSS ET AL 1,856,151
METHOD AND APPARATUS FOR FORMING CORRUGATED METAL
Filed July 2, 1930 7 Sheets-Sheet 1

INVENTORS.
Richard R. Bloss
Roy C. Pfeil.
BY
ATTORNEY.

May 3, 1932. R. R. BLOSS ET AL 1,856,151
METHOD AND APPARATUS FOR FORMING CORRUGATED METAL
Filed July 2, 1930  7 Sheets-Sheet 2

INVENTORS
Richard R. Bloss.
Roy C. Pfeil.
BY
Edwin P. Carpen
ATTORNEY

INVENTOR.
Richard R. Bloss.
Roy C. Pfeil.
BY
ATTORNEY.

May 3, 1932.  R. R. BLOSS ET AL  1,856,151
METHOD AND APPARATUS FOR FORMING CORRUGATED METAL
Filed July 2, 1930    7 Sheets-Sheet 4

INVENTOR.
Richard R. Bloss.
Roy C. Pfeil.
BY
ATTORNEY

May 3, 1932. R. R. BLOSS ET AL 1,856,151
METHOD AND APPARATUS FOR FORMING CORRUGATED METAL
Filed July 2, 1930   7 Sheets-Sheet 5
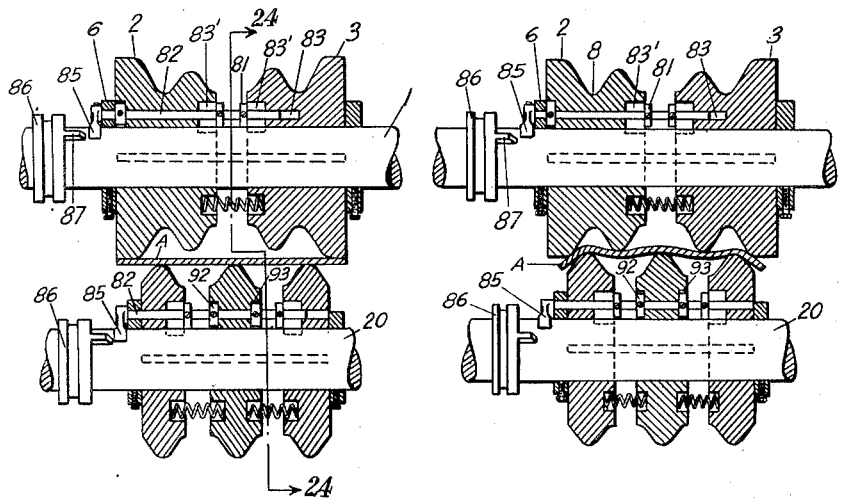
Fig. 21   Fig. 22
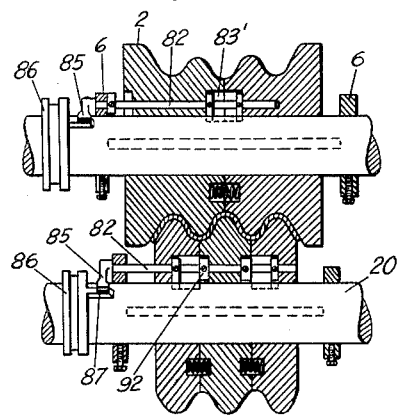 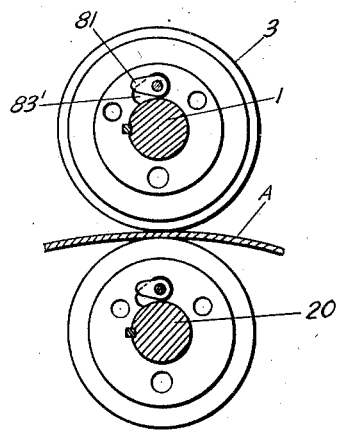
Fig. 23   Fig. 24
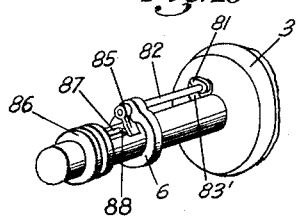
Fig. 25
INVENTORS
Richard R. Bloss.
Roy C. Pfeil.
BY
Edwin P. Corbett
ATTORNEY.

INVENTORS
Richard R. Bloss.
Roy C. Pfeil.
BY
ATTORNEY.

INVENTORS.
Richard R. Bloss.
Roy C. Pfeil.
BY
Edwin P. ──── ATTORNEY.

Patented May 3, 1932

1,856,151

UNITED STATES PATENT OFFICE

RICHARD R. BLOSS AND ROY C. PFEIL, OF COLUMBUS, OHIO, ASSIGNORS TO THE INTERNATIONAL DERRICK & EQUIPMENT COMPANY, OF COLUMBUS, OHIO, A CORPORATION OF OHIO

METHOD AND APPARATUS FOR FORMING CORRUGATED METAL

Application filed July 2, 1930. Serial No. 465,393.

Our invention relates to a method and apparatus for forming corrugated metal. It is particularly applicable to the formation of corrugated metal tubes such as tug rims et cetera, although it is not necessarily limited thereto and may be applied otherwise if so desired.

In the past, it has been customary to make corrugated metal tub rims, or articles of a similar nature, by subjecting the metal to pairs of corrugating rolls, each of these rolls being formed in one piece. These rolls grip the metal after the initial formation of the corrugation in such a manner that it is impossible for the metal to flow transversely across the ridges of the rolls. From this, it results that the metal is locked upon the roll and the corrugating action is accomplished partially by stretching, which tends to weaken the product. It has been suggested that the rolls be formed in sections and that these sections be positively moved toward each other during the rolling action, but one of the drawbacks of this method has been the difficulty in getting the correct speed at which the rolls should move axially toward each other in a positive manner.

One object of our invention lies in the provision of a method and apparatus for forming corrugations in tubular sheet metal, particularly in tug rims, whereby such corrugations may be formed in a minimum length of time and with a relatively small amount of labor.

Another object of our invention lies in the provision of a method and apparatus for corrugating metal which are of such a nature that the corrugations will be produced by a bending action and that stretching will be practically eliminated with a consequent tendency to preclude tendency of the metal to crack or striate.

Our invention preferably contemplates the production of corrugated tubular metal by forming the corrugations in the metal after it has been converted into an annular rim or tube of flat metal. In this form, we subject it to pressure from opposing rolls which are moved toward each other gradually during the rolling operation. The rolls which we utilize are formed in sections which are preferably spaced apart rigidly during the formation of initial grooves of comparatively shallow depth and which are released and permitted to move toward each other during the subsequent accentuation of these grooves and the finishing thereof.

More specifically, we preferably subject the circular band of metal to opposing sectional rolls with the sections rigidly spaced apart for a sufficient length of time to initially groove the metal. After these initial grooves are produced and without stopping the rolling action, if desired, we release the roll sections so that they may move toward each other to bend the walls of the corrugation into final form. These successive operations may or may not be accomplished continuously, that is, without stopping the rolling action upon the metal.

Our invention also preferably contemplates the provision of a novel means for guiding the metal blank between the rolls until such time as the rolls have formed a groove or path therein. However, the use of such guiding means is not absolutely essential for rotating the rolls.

Other objects and advantageous features of our invention will be noted in the following detailed description and in the accompanying sketches wherein similar figures of reference designate corresponding parts and wherein:

Figure 21 shows another form of apparatus for holding the upper and lower roll sections against axial movement during initial indentation of the plate, wherein the upper roll sections as well as the lower roll sections are held apart by lugs. The rolls are shown in the position prior to initial grooving of the rim.

Figure 22 is a vertical sectional view, showing the position of the various operating parts of the apparatus during initial grooving of the plate.

Figure 23 is a vertical sectional view illustrating the manner in which the roll sections are released during final corrugation of the rim.

Figure 24 is a section taken on the line 24—24 of Figure 21.

Figure 25 is a detail in perspective showing the lug means for precluding axial movement of the rolls and the means for actuating it.

Figure 1:
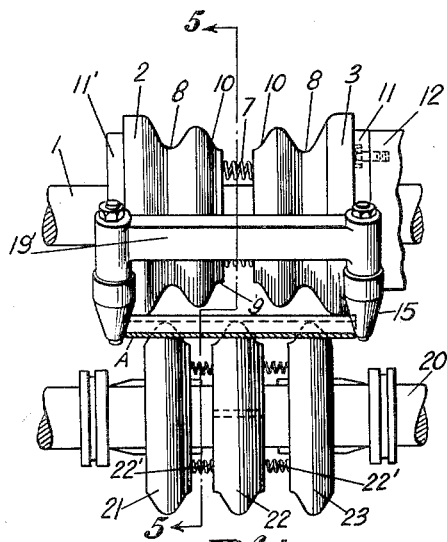
Figure 1 is a front view of the preferred form of our roll sections wherein the roll sections are held in spaced relation on their respective shafts prior to the corrugating operation, and in addition, a means for preventing axial displacement of the metal blank is shown as being mounted in connection therewith.

In the drawings, Figures 1 to 9 inclusive, we have shown the upper roll unit as comprising a rotatable shaft. On this shaft, are located roll sections that are splined thereto and are caused to rotate therewith. That is, each roll section is provided with a longitudinal groove 4, Figure 5, that cooperates with a longitudinal key 5, located in a suitable groove in the shaft 1. The roll sections are free to move axially along the shaft until such time as their inner faces contact, or until their longitudinal movement in the opposing direction is prevented by the bracket arms 11 and 11'. These arms may be formed as a part of a means for preventing axial displacement of the blank during corrugating operation, and will be hereinafter described more in detail. However, this means for preventing axial displacement is not an essential part of our invention.

Figure 6:
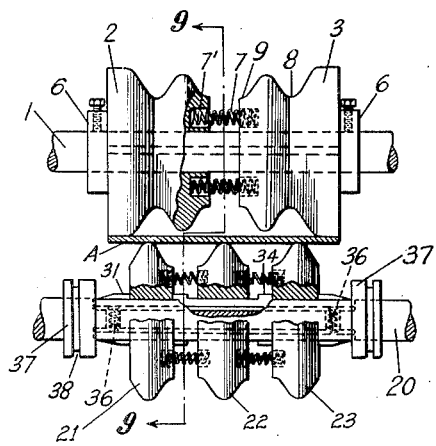
Figure 6 is a front view, partly in section showing the preferred form of our rolls prior to the corrugating action, the upper rolls being located by set collars and held apart by springs, and the lower rolls being held in spaced relation by keys.

In Figure 6, the outward longitudinal movement of these two roll sections is prevented by the set collars 6, that are rigidly mounted on the shaft 1 immediately in rear of each respective roll section and are spaced apart sufficiently to allow limited longitudinal movement thereof. It is apparent, that if the means for preventing axial displacement of the sheet is not utilized, the set collars 6 may be substituted to locate the roll sections.

Figure 2:
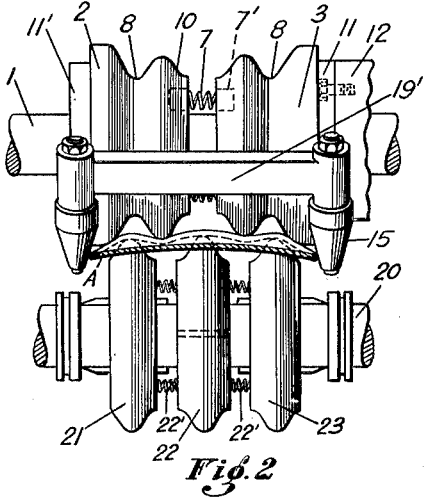
Figure 2 is a front view of our corrugating apparatus showing the position of the rolls during initial indentation of the rim, wherein the roll sections have been moved closer together vertically but the rolls mounted on each shaft still remain in spaced position.

The roll sections 2 and 3 are held in spaced relation by the oppositely disposed expansion springs 7 that have their respective ends located in sockets 7', Figures 2 and 6, formed in opposing faces of the roll sections.

The primary function of these expansion springs is to resiliently hold the roll sections 2 and 3 in the position shown in Figure 1. During the corrugating process, as will be set out hereinafter more in detail, the roll sections 2 and 3 will move toward each other against the action of these springs and, at the termination of the corrugating process, these springs will act to return the rolls to initial position. The sockets 7' are of proper size to allow the resilient members to be compressed therein without buckling or otherwise precluding the ultimate contact of the roll sections.

With reference to Figure 1, it will be noted that each of the roll sections 2 and 3 is provided with a peripheral groove 8 formed in the body portion thereof. Furthermore, the periphery of each of these roll sections is so formed adjacent the respective inner portions thereof, that when these two roll sections 2 and 3 move to such position as to contact with each other, a third groove 9, (Figure 4) is formed. In order to accomplish this, the opposing end portions of each respective roll section are cut away as at 10 to form the respective side walls of this groove 9. When the roll sections are moved to such position as to contact with each other, Figure 4, it will be apparent that a continuous surface having shoulders and grooves will be formed. It will be noted that the outer end portion of each respective upper roll section is of somewhat greater diameter than the body portion of the roll. After the metal sheet A, which is preferably of annular form, has been introduced into the apparatus, these circular end surfaces of the respective roll sections rest on the upper surface of the plate adjacent the marginal edge thereof.

The hereinbefore mentioned means for preventing the axial displacement of the metal sheet A as it progresses through the apparatus is adapted to be carried by the shaft which supports the upper roll sections. This means is adapted to contact with the marginal edges of the plate before it enters the apparatus during initial indentation thereof, and serves to properly align it during passage therethrough. It also guides the plate as it leaves the apparatus. Thus, the plate is guided into the apparatus, held in position during initial grooving thereof and is guided therefrom. However, it will be understood that the use of such guiding means is not absolutely essential and its use is optional.

Figure 5:
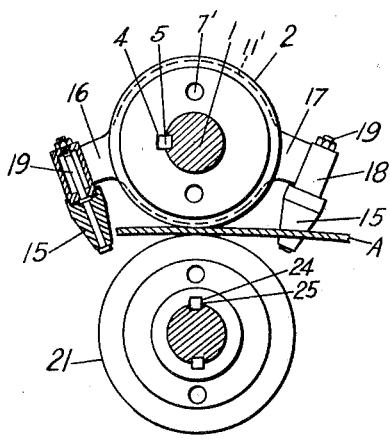
Figure 5 is a vertical section taken on the line 5—5 of Figure 1.

This guide means preferably comprises a carrier made up of the bracket members 11 and 11' that are each mounted in concentric relation to the shaft 1, as shown in Figure 5. This carrier is supported by the attachment of bracket member 11 to the cylindrical sleeve 12 that is also mounted in concentric relation to the shaft and on one side of the roll sections. This carrier does not rotate with the shaft. The sleeve 12 is preferably secured to the shaft support, not shown, to preclude movement of the carrier.

These brackets 11 and 11' are preferably provided with the integrally formed arms 16 and 17 that extend downwardly and outwardly from that section of the bracket that is mounted in concentric relation to the shaft 1. Each arm is equipped, at its outermost end, with an annular enlarged portion 18 that is drilled longitudinally for the reception of the pin 19. In addition, the two brackets 11 and 11' are joined by a transverse bar 19' that extends between the enlarged portions 18 formed at the forward end of each respective bracket, and between the enlarged portions formed at the rearmost end of each respective bracket.

Mounted on the lower end of each pin 19 is a cone-shaped roller 15. Each roller is rotatable about the pin. It will be understood that during the operation of corrugating, the rolls and the guide means may be moved up and down with the shaft 1. At the beginning of the operation of corrugating, the cone-shaped rollers 15 disposed in front of the rollers 2 and 3 are adapted to have their lowermost ends contact with the edge of the blank A, as shown in Figure 1. As the shaft 1 is moved downwardly, the roll sections 2 and 3 will act on the plate, in a manner to be hereinafter described, whereby the edges of the plate will be angled down as shown in Figure 2. At this time, the edges of the blank A follow along the tapered surfaces of the guide rollers until such time as the action of the upper and lower roll sections on the plate, cause these edges to recede from the guide rollers 15.

In other words, the cone-shaped guide rollers move down with the upper corrugating roll and, the marginal edges of the annular blank being corrugated, follow along the tapered surface of the guide rollers. These tapered rollers are thus always in contact with the edges of the blank during initial grooving thereof. As the upper corrugating rolls move downward still further, Figure 4, the edges of the metal recede from the guide rollers and the metal is then guided by the grooves that have been partially formed by the corrugating rolls, all of which will be hereinafter referred to more in detail.

The roller guides described above are tapered; however, this same result can be accomplished by means of cylindrical rollers mounted on slide rails and caused to move toward each other as the edges of the metal come together by the use of a screw, driven from the shaft that drives the rolls or by other means, the idea being to have rollers or other means to serve as a guide for the metal being corrugated until the corrugating rolls have formed grooves or paths in the plate. These grooves or paths then serve to guide the metal through the rolls. It will be understood that the use of guiding rolls is not necessary and that they may be dispensed with if desired.

The lower roll unit preferably comprises a rotatable shaft 20. On this shaft are mounted the roller sections 21, 22 and 23. Each roll section is grooved longitudinally as at 24, Figure 5, and is splined to the shaft by means of the longitudinal key 25 that is located in a suitable groove therein. However, the two end roll sections 21 and 23 are adapted to move longitudinally on the shaft when a means for holding them in the position, shown best in Figure 6, is released. This means will be hereinafter referred to more in detail. The center roll section 22 is preferably fixed against axial movement with relation to the shaft 20 by means of a secondary key, not shown, or by any other means desired.

Figure 3:
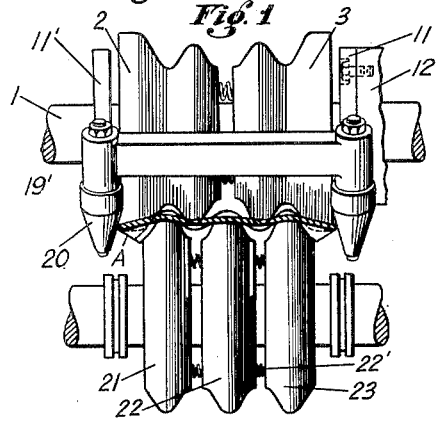
Figure 3 is a front view of our corrugating apparatus, showing the position of the rolls immediately after the individual rolls have been released against axial movement to allow them to float along their respective shafts.

We have provided a plurality of expansion springs 22' that are located between the center roll section 22 and the end roll sections 21 and 23, as shown in Figures 1 and 2. The purpose of these springs is to return the two end roll sections 21 and 23 to the position shown in Figure 1, at the termination of the corrugating process. We preferably mount three pairs of these springs between the roll sections as shown in Figures 1, 2 and 3.

Figure 4:
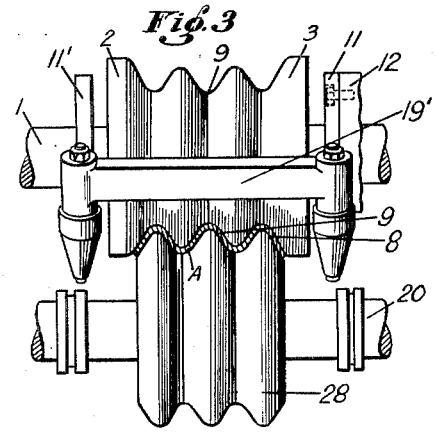
Figure 4 is a front view of our corrugating apparatus showing the position of the rolls during final corrugating action.

As will be noted in Figure 4, the two end roll sections 21 and 23 are adapted to move inwardly on the shaft 20 until such time as they contact with the center roll section 22. When they are in this position, the peripheral shoulders 28 thereof are adapted to be in alignment with the grooves of the upper roll section, and are adapted to cooperate therewith to form the finished corrugated rim as will be hereinafter described.

It will be understood that the shaft 20 may or may not be vertically reciprocable. The shaft 1, however, is so mounted that it may be moved up and down with relation to the shaft 20, any suitable means being employed to do this. When the shaft 1 is moved downwardly toward the shaft 20 during the corrugating process the roll sections 2 and 3 will tend to move toward each other as will the roll sections 21 and 23. When the roll sections of each roll have moved longitudinally into contact with each other, the shoulders 28 of the lower roll sections should be in interfitting relation with the end grooves 8 and the center groove 9 of the upper roll sections.

We have shown in Figures 6 to 9 inclusive, one form of apparatus for precluding longitudinal movement of the two lower end roll sections during the period of initially grooving the plate A.

Figure 9:
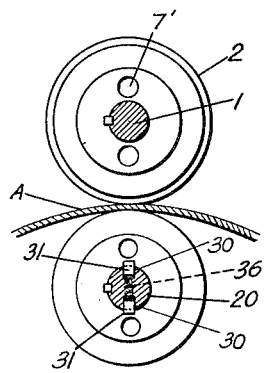
Figure 9 is a section taken on the line 9—9 of Figure 6.

With reference to Figure 9, it will be seen that the shaft 20 has been grooved longitudinally as at 30. These grooves are formed on diametrically opposite sides of the shaft 20 and extended thereinto sufficiently to allow keys 31 to be disposed therein. These keys 31 will extend the entire length of the groove and the opposing ends thereof are beveled as at 32 (see Figure 10). The body portion 33 of each key is equipped with spaced upstanding lugs 34.

These keys are adapted to be moved in and out in their respective grooves. By moving these keys outwardly in their grooves the lugs 34 may be projected outwardly beyond the periphery of the shaft, or by moving the keys inwardly in their grooves the lugs 34 may be withdrawn within the periphery of the shaft.

Figure 7:
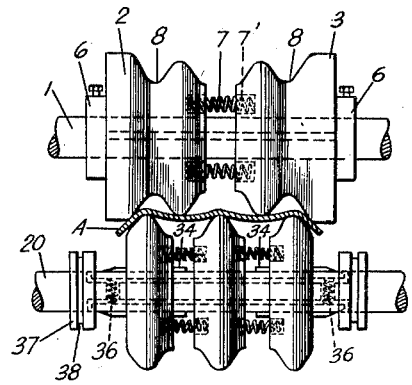
Figure 7 is a front view showing the position of the roll sections at the end of the initial corrugating action, wherein the two lower end rolls are still held in spaced relation the keys.

It will be understood, that the end roll sections 21 and 23 will be prevented from moving axially on the shaft 20 when the apparatus is in the position shown in Figures 6 and 7, wherein the lugs 34 extend beyond the periphery of the shaft 20 and lie intermediate the end roll sections and the center roll section.

Figure 10:
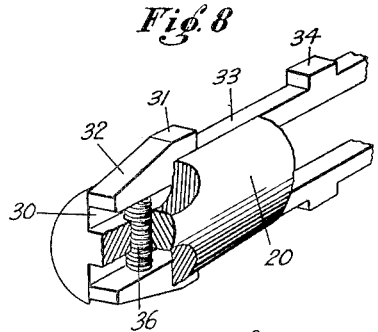
Figure 10 is a detail in perspective, showing a section of the lower shaft with the keys which we utilize for precluding axial movement of the lower rolls mounted in cooperation therewith.
Figure 37:
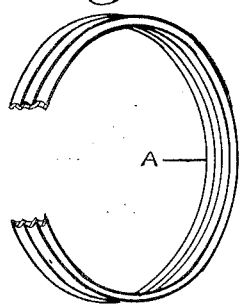
Fig. 37 is a perspective view, partly broken away, showing the article produced.

Each collar 37 is grooved as at 38, for the reception of a lever, not shown, by means of which the collar may be moved longitudinally along the shaft 20. When it is desired to release the end roll sections 21 and 23, the collars 37 are moved inwardly toward each other, thus withdrawing the keys in their respective grooves through the engagement of the collars 37 with the beveled surfaces 32 of the keys. This action is against the resilient force exerted by the compression springs 36 that are mounted in the shaft 20 adjacent the respective ends of each key, and project through the bases of the grooves, as illustrated in Figure 10. Thus, the lugs 34 are removed from such position as to preclude axial movement of the end roll sections and as a result, the roll sections are free to move axially on the shaft 20, but on movement of the collars 37 in a reverse direction the springs will return the keys to the position shown in Figure 1, providing the roll sections have been separated by the springs provided for this purpose.

In operation, the upper shaft 1 and the roll sections 2 and 3 mounted thereon may be rotated by any suitable means desired. The lower roll sections and the shaft 20 are also rotated either by the same means or by a separate means. The plate A which may comprise a flat shape or the curved rim of a tug wheel, is inserted between the rollers as shown in Figure 1.

In this position, the plate is supported on the shoulders 28 of the lower roll sections, and, if desired, the means for preventing axial displacement thereof shown in Figures 1 to 5 inclusive may be mounted on the upper roll shaft support to correctly align the plate during the corrugating operation. It will be noted, in Figure 1, that both lower sections and upper sections are spaced apart and the ribs of both lower and upper rolls are adapted to come initially in contact with the plate at the exact point at which they will come in contact therewith after the corrugations have been completely formed.

To form the initial grooves in an annular band of metal, the upper roll member is moved downwardly toward the lower roll member while both rolls are rotating, so that pressure is applied to the metal both from above and from below. It is preferable to gradually maintain this pressure of the rotating rolls until the metal is indented substantially to the extent shown in Figures 2 and 7, this indentation being produced while these roll sections are maintained in their initial separated relation. These rolls rotating at a selected rate of speed and progressively rotating the annular band of metal ultimately serve to produce a plurality of shallow grooves in the band and to bend the edges of the band of metal downwardly at an angle. When guide rollers such as shown at 15 are being used they will still remain in intimate contact with the edges of the annular band of metal. During this operation, the sections of the upper rolls and the sections of the lower rolls are maintained in their same separated relation by the keys 33.

Figure 8:
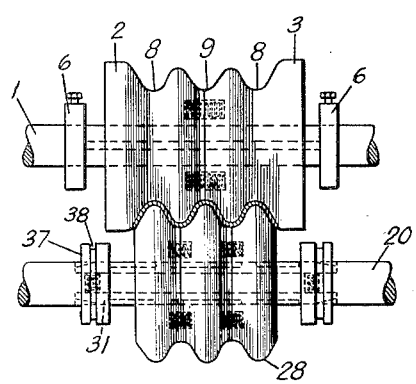
Figure 8 is a front view showing the position of the roll sections during final corrugation of the plate, wherein the keys have been moved inwardly toward each other to allow unrestricted axial movement of the outer sections of the lower rolls, which movement has occurred so that they have been brought into contact with the fixed center roll.

After indentation of the annular band of metal, the collars 37, Figure 8, will be moved along the shaft 20 toward each other to depress the keys 33, thus allowing the roll sections 21 and 23 to move freely in a longitudinal direction on the shaft 20. As the roll sections are released, the upper roll and the lower roll will continue movement towards each other at a selected rate of speed. It is obvious that as the corrugation of the metal progresses it will be necessary for the metal intermediate the marginal edges thereof to stretch around the roll, or for the rolls to draw in closer together. The latter action prevails in view of the fact that the ribs of the respective rolls still follow the grooves initially formed in the blank and, as the roll sections draw closer together, the metal will be bent thereover to increase the depth of each respective groove.

In other words, the tension created in the metal by the corrugating action will serve to pull the roll section of each roll, with the exception of the center roll section on the lower shaft, axially together. Obviously the depth of the corrugations will be determined by the depth of the peripheral grooves of the roll sections. By thus permitting the rolls to come together, the tension in the metal will be relieved and the tendency of such metal to stretch and split will be obviated.

When the roll sections move to such position as shown in Figure 4, the grooved metal blank will be rotated through the final stage of the corrugating action. By thus bringing the rolls into close proximity in this final corrugating operation, the blank A that is located therebetween, will have had the surface, intermediate its margin, finally shaped into a corrugated surface.

In Figures 11 to 15, inclusive, we have shown another form of apparatus for preventing longitudinal movement of the two end roll sections mounted on the lower shaft 20 in combination with a cam means for causing the operation thereof. In this apparatus, we preferably intend to preclude the movement of the end roll sections by utilizing a plurality of keys mounted in grooves formed in the shaft. These keys will be equipped with lugs that will prevent axial movement of the end roll sections during a certain period of the corrugating process.

Figure 11:
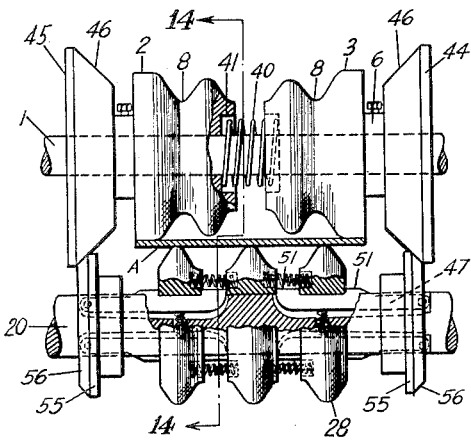
Figure 11 is a front view partly in section, showing our roll sections prior to the commencement of the corrugating action, wherein the upper rolls are held apart by a light spring, and the lower end roll sections are precluded from axial movement by another form of key actuated by a cam member.
Figure 12:
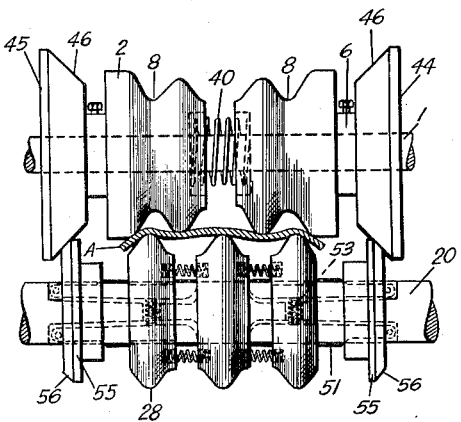
Figure 12 is a front view showing the position of the rolls, at the end of the operation of initially grooving the plate, wherein the upper and lower rolls have moved closer together although the separate roll sections mounted on their respective shafts have not, as yet, been released to move toward one another.
Figure 13:
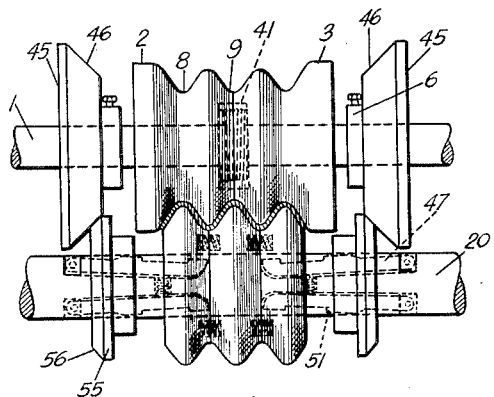
Figure 13 is a view illustrating the respective positions of the rolls, the cam members and the keys during final corrugation of the plate wherein the two lower end roll sections have been released and have been allowed to float along the shaft into contact with the fixed center roll section.
Figure 14:
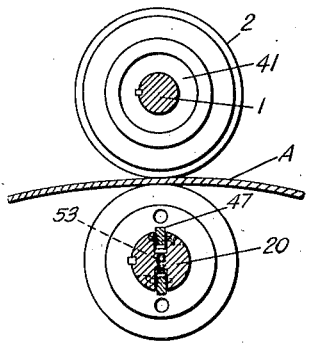
Figure 14 is a section taken on the line 14—14 of Figure 11.

More specifically, it will be noted in Figure 11 that the roll sections 2 and 3 are splined upon the shaft 1 and are held in spaced relation by means of the coil spring 40 that is mounted in concentric relation to the shaft 1 and has its respective ends disposed in the sockets 41 formed in the opposing faces of the roll sections. The rolls are located by the usual set collars, and if desired, the guide means for guiding the metal during the corrugating process may be mounted on the shaft if desired.

In addition, we have mounted two circular cam members 44 and 45 on the shaft 1, each member being disposed directly in rear of a set collar. These cam members are fixed against axial movement on the shaft 1 and are adapted to rotate therewith. The peripheral face of each cam member is beveled as at 46 for a purpose to be hereinafter described.

The lower shaft 20, is equipped with the usual roll sections that are splined thereon and are rotatable therewith. As hereinbefore mentioned, the center roll section is fixedly secured to the shaft and the end roll sections are capable of restricted longitudinal movement.

Figure 15:
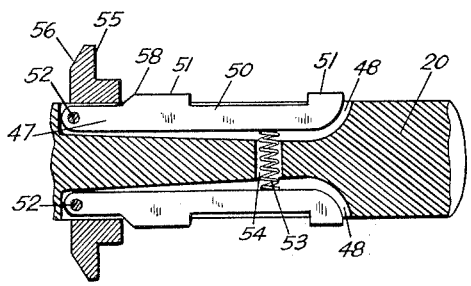
Figure 15 is a detail in section showing a portion of the shaft with the keys which we utilize in this instance, for precluding axial movement of the two lower end roll sections during initial grooving of the plate, mounted therein.

To prevent longitudinal movement of the end roll sections during the initial grooving period, we have provided keys 47 that are located in slots 48 formed in those sections of the shaft upon which the end roller sections are mounted.— These keys are adapted to be held in outermost position in their grooves by means of an expansion spring 53, located in sockets 54 in the shaft 20 (Figure 15). That is, these keys are pivotally connected to the shaft 20 by means of pivot pins 52 and the free end thereof will be forced outwardly by springs 53.

These keys are identical in structure and each preferably comprises a shank portion 50 equipped with spaced lugs 51 that extend outwardly from the body portion thereof. The innermost lug on each key is provided with a bevel surface as at 58. These lugs are preferably spaced apart sufficiently to allow a roll section to lie therebetween.

Thus during the operation of initially grooving the plate, (Figures 11 and 12) the lugs on the keys will extend beyond the periphery of the shaft 20 and will preclude axial movement of the roll sections. To lower these keys and to withdraw the lugs from interlocking relation with the end roll sections, we have provided the collars 55 that are mounted in opposition to one another on the shaft 20 and on both sides of the lower roll sections. These collars are equipped with radial flanges having the periphery thereof beveled as at 56. Furthermore, these beveled surfaces of the radial flanges are adapted to cooperate with the beveled peripheries of the cam members 44 and 45. During the corrugating process, immediately after the metal has been initially grooved as in Figure 12, the movement of the shafts 1 and 20 toward each other will cause the cams 44 and 45 to descend and force the collars mounted on the roller shafts inwardly toward each other by engagement of the cooperating beveled surfaces. The collars will engage the beveled surface 58 of each respective key to depress the free end thereof. This action will retract the lugs 51 into the shaft 20 and from engagement with the roll sections to allow unrestricted axial movement thereof.

In Figures 16 to 19, inclusive, we have shown another form of apparatus for preventing longitudinal movement of the two end roll sections mounted on the lower shaft 20 in combination with a means for causing the operation thereof. The upper roll is the same as that shown and described in Figure 6, and is adapted to operate in the same manner.

As will be noted, the upper shaft 1 is provided with one set collar 6, and a sleeve formed as an integral part of a circular cam member has been substituted in lieu of the other set collar. This cam member 63 is provided with a vertical end face and a beveled periphery as at 60. The function of this member will be hereinafter referred to.

The lower shaft 20 which is substantially increased in diameter over the shafts shown in the preceding figures, is shown as having the three roll sections 28 mounted thereon. These roll sections are located by the set collars 20', and as in Figure 6, the two end roll sections are adapted to move longitudinally on the shaft. The center roll section is fixedly secured to the shaft and does not move axially with respect thereto.

Figure 16:
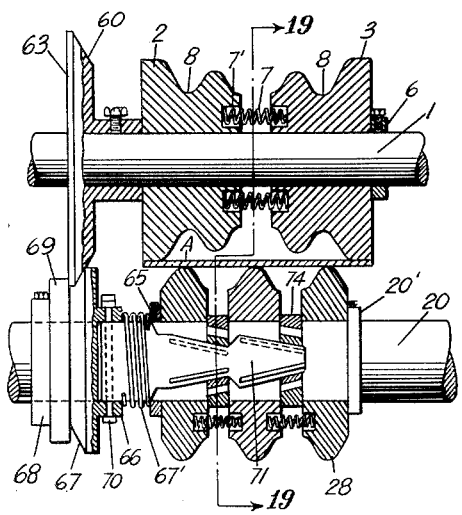
Figure 16 is a vertical sectional view showing another form of means for precluding axial movement of the lower end roll sections in combination with a cam means for operating it.

In order to prevent longitudinal movement of the two end roll sections during a certain period in the operation of our device, we have provided the locking bolt members 74 that are disposed intermediate the end roll sections and center roll section. These locking bolt members 74, are adapted to be simultaneously projected in opposing directions beyond the periphery of the shaft 20, as best shown in Figure 16.

In order to accomplish this, the shaft 20 is provided with a rectangular slot 64 that extends entirely therethrough and is formed in that portion of the shaft on which the lower roll sections are mounted. In this section of the shaft, we have placed a member 71 that is adapted to be reciprocated therein longitudinally, by a means hereinafter described.

Figure 17:
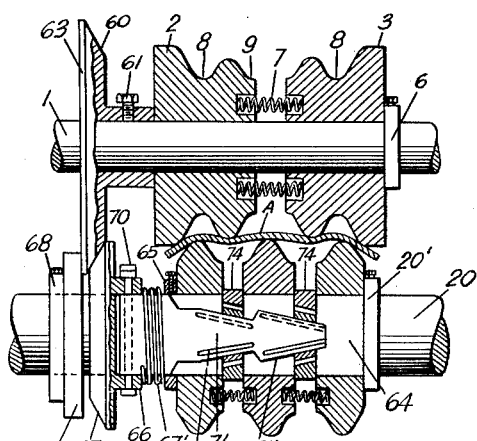
Figure 17 is a view showing the position of the roll sections during the operation of initially grooving the rim.
Figure 18:
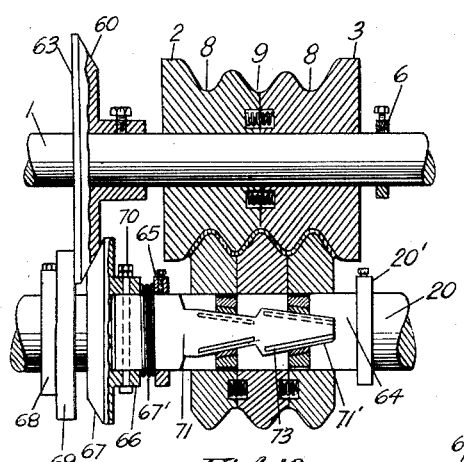
Figure 18 is a vertical sectional view of the roll sections in final position for corrugating a plate wherein the cam members have operated on the means for holding the lower end rolls against axial movement to release them and to allow them to float along the shaft.
Figure 19:
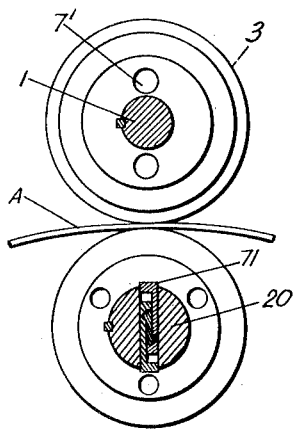
Figure 19 is a section taken on the line 19—19 of Figure 16.

This member 71 preferably comprises a shank portion having two integrally formed wedge-shaped sections of substantially the same dimensions that are both provided with angling upper and lower surfaces as at 71'. Each wedge-shaped section is adapted to lie directly under one of the end roll sections, as shown in Figures 16 to 18, inclusive. The locking bolt members 74 will be mounted on the wedge-shaped surfaces of this member 71, as shown in Figure 20, and will be held upright by engagement with the walls of the slot 64.

Figure 20:
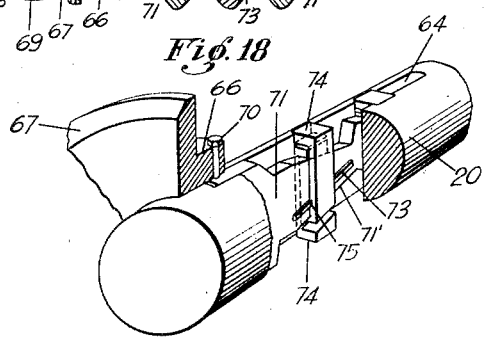
Figure 20 is a detail in perspective, partly broken away, showing the form of means which we preferably utilize, in this instance, for precluding axial movement of the lower end roll sections, mounted in cooperation with a portion of the lower shaft.

With reference to Figure 20, it will be noted that each wedge-shaped section is provided with two tongues 73 that are disposed on opposing faces thereof. The tongue on the one side of the wedge-shaped section lies adjacent one edge thereof and extends downwardly at approximately the same angle. The tongue on the opposing side of the wedge-shaped section lies adjacent the other edge of the wedge-shaped portion and is parallel with the inclined edge thereof, as shown in Figure 20.

When the locking bolt members are mounted on the wedge-shaped sections, the tongues 73 are adapted to cooperate with grooves 75 that are formed on the respective inner vertical wall of each member. It can readily be seen that, although frictional resistance to longitudinal movement is brought to bear against the locking bolt 74, movement of the member 71 in either direction will serve to reciprocate the locking bolts in a direction at right angles thereto, thru the engagement of the tongues mounted on opposing sides of the wedge-shaped sections, with the grooves 75 of the respective locking bolt members.

With the locking bolts in extended position, as best shown in Figures 16 and 17, it will be noted that they will contact with the vertical faces of the roll sections between which they lie, and when the member 71 is moved longitudinally the locking bolt members will be prevented from moving bodily therewith and as a result will be withdrawn from engagement with the roll sections.

The means which we preferably utilize for actuating the member 71 comprises a collar 66 that is mounted on the shaft 20 as shown in Figure 16. The collar is pinned to the member 71 by means of the vertical pin 70, Figure 16, that extends entirely through the collar and through one end of this member 71. An expansion spring 67' is placed intermediate the collar 66 and the set collar 65 mounted on the shaft 20. The collar 66 is further provided with a radial flange that is equipped with a beveled face 67 adapted to cooperate with the beveled face 60 of the circular cam member 63 mounted on the shaft 1. Directly in rear of the collar 66 is another collar 68 that is fixedly secured to the shaft and is adapted to rotate therewith.

In operation, at the commencement of the corrugating process, as illustrated in Figure 16, the locking bolts are shown in extended position wherein they project outwardly from the periphery of the shaft to prevent axial movement of the two lower end roll sections. At this time, the collar 66 has been moved as far to the left as possible by the spring 67' thus serving to hold the member 71 in the position shown.

During initial indentation of the plate, as shown in Figure 17, the locking bolts 74 are still in projected position to prevent longitudinal movement of the end roll sections. Furthermore, the cam member 63 mounted on the upper shaft 1 has been moved downwardly until the beveled periphery 60 thereof engages with the beveled periphery 67 of the collar 66. Further downward movement of the cam 60 will force the collar 66 to one side, which resultantly moves the arm 71 longitudinally to withdraw the keys 74.

In this form of apparatus we have shown both rolls as having the respective sections thereof separated by a plurality of expansion springs. It is to be understood, that the use of such springs, especially on the lower roll section is entirely optional and, if it is found desirable, these members may be removed and the two end roll sections may be returned to initial position manually.

With reference to Figures 21 to 25 inclusive, we have shown therein another form of apparatus for precluding longitudinal movement of the various roll sections. In this apparatus, the upper roll sections are positively held during the initial grooving operation, against longitudinal displacement. Likewise, the two lower end roll sections are also held against axial movement during the same period and by a slightly modified form of apparatus with relation to that utilized for initially spacing the upper roll sections.

In Figure 21, the upper roll sections 2 and 3 have been provided with a lug shaft 82 that is journaled at one end in the set collar 6 and at the opposing end in a longitudinal bore 83 formed in the roll section 3. This lug shaft 82 is provided with the cam lugs 81 that are mounted thereon in the manner shown in Figure 21. That is to say, each respective lug lies adjacent the inner vertical face of one of the roll sections 2 or 3. Furthermore, these lugs 81 preferably take the form shown in Figure 24 and are adapted to be rotated by the lug shaft 82 through a portion of an arc to bring them into registry with the openings 83', Figures 21 and 24, formed in each respective roll section.

It can readily be seen, that when the lugs 81 are in the position shown in Figure 24, the roll sections will be precluded from axial movement, but when these lugs are rotated into registry with the respective openings 83' the roll sections will then be capable of moving longitudinally on the shaft 1. To rotate the lug shaft 82, we have equipped it with a lever 85 that extends at right angles thereto and is rigidly mounted on the free end thereof. When the lugs 81 are in the position shown in Figure 24, the under side of the lever 85 should lie in contact with the shaft 1. A collar 86 is slidably mounted on the shaft 1 and is provided with a longitudinal extension 87 having a forward beveled face 88. When this collar is moved toward the roll sections the beveled face 88 of the extension will throw the lever 85 upwardly to rotate the lug shaft and thus bring the lugs 81 into registry with the openings 83'.

With reference to the lower shaft, the lug arrangement for releasing the roll sections is duplicated with the exception that the center roll section is equipped with suitable sockets 93 for the reception of the circular members 92 mounted on the lug shaft. This is for the purpose of supporting the lug shaft against longitudinal movement.

This lug apparatus mounted on the lower shaft 20 operates in exactly the same manner as the apparatus mounted on the upper shaft and it will be readily apparent that movement of the collar toward the roll section will ultimately cause rotation of the lug shaft 82' to bring the lug keys into registry with the openings formed in the two end roll sections.

In this form of apparatus, we have also shown the upper and lower roll as having resilient members interposed intermediate the respective roll sections, although the use of such resilient members is entirely optional.

In operation, when the metal sheet A is first positioned between the roll sections, Figure 21, the lug members on both upper and lower shafts are out of registry with their respective openings and are operating to hold the rolls against axial movement. During initial indentation of the plate, Figure 22, the respective rolls mounted on the shafts 1 and 20 are moved closer together but are still maintained in spaced relation by the lug means. At the end of this operation of initially indenting the plate, the collars 86 mounted on both upper and lower shafts are moved to the right to engage the levers 85 as hereinbefore explained. This action will bring the lugs 81 into registry with their respective openings and will allow axial movement of the roll sections on the respective shafts.

With reference to Figures 26 to 30 inclusive, we have shown another form of apparatus for preventing longitudinal movement of the two upper roll sections and the two lower end roll sections during initial indentation of the plate.

In this instance, the two upper roll sections 2 and 3 are mounted on a sleeve 112 that is mounted on the shaft 1, rotatable therewith and fixed against longitudinal movement with respect thereto. The roll sections 2 and 3 are splined to the sleeve 112 in such a manner as to be longitudinally movable thereon.

As will be noted, the sleeve is equipped with the oppositely disposed longitudinal passages 110' that extend partially therethrough. Each passage is equipped with a cam rod 111 that is bolted at one end to a collar 114 by means of which the levers may be reciprocated longitudinally in their respective passages.

Figure 26:
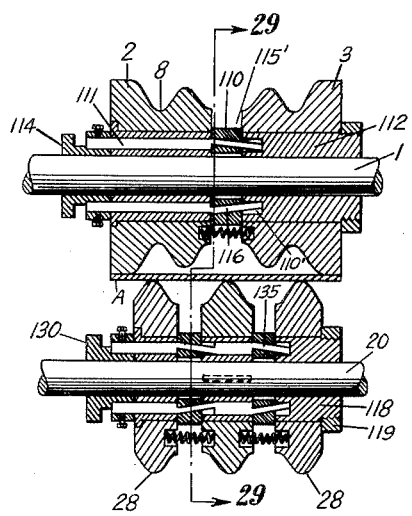
Figure 26 is a vertical sectional view of the apparatus prior to grooving of the plate, wherein the roll sections are mounted on sleeves and are precluded from axial movement by means of a plurality of reciprocable bolts.
Figure 27:
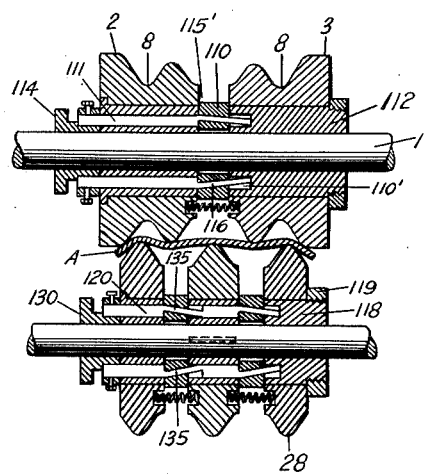
Figure 27 is a vertical sectional view illustrating the position of the various parts of our apparatus during initial grooving of the rim.

The opposing end of each respective key is equipped with a tongue 116 that is inclined at an angle from the main body portion of the cam rod, Figure 26. A bolt member 110 is adapted to be mounted on each angling portion and is disposed in a vertical passage 115', in the sleeve 112 that communicates with the passage 110'. In the position shown in Figure 26, the bolt members 110 lie intermediate the inner vertical faces of the roll sections 2 and 3 and are in such position as to preclude longitudinal movement thereof. Furthermore, each bolt member 110 is provided with an angling groove 115, Figure 30, that is adapted to cooperate with the angling tongue 116.

Figure 28:
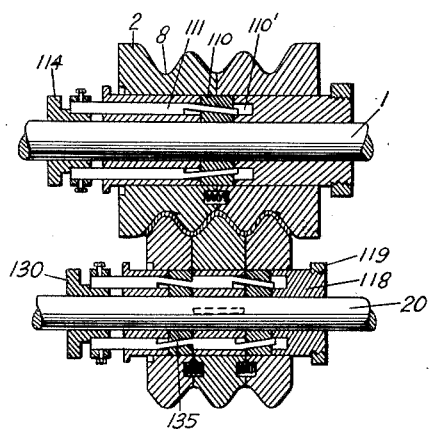
Figure 28 is a vertical sectional view showing the position of the various parts of our apparatus during the final corrugating action.
Figure 29:
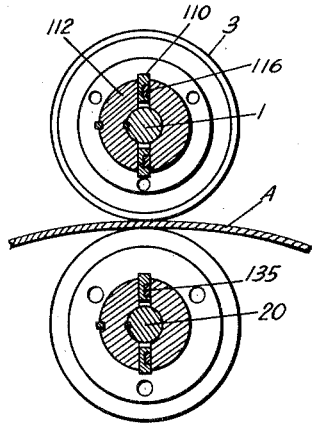
Figure 29 is a section taken on the line 29—29 of Figure 26.
Figure 30:
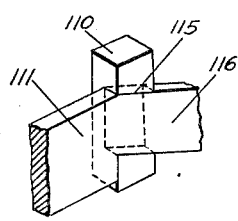
Figure 30 is a detail in perspective showing the form of bolt which we have shown in Fig. 26 to 29, inclusive, precluding axial movement of the roll sections during initial indentation of the rim.
Figure 31:
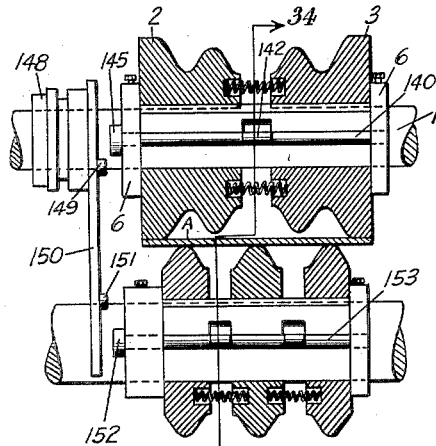
Figure 31 is a vertical sectional view showing still another form of apparatus for precluding axial movement of the roll sections wherein both the upper roll sections and the lower end roll sections are maintained in spaced relation by means of a notched rod. This view shows the rolls in a position prior to grooving of the rim.
Figure 32:
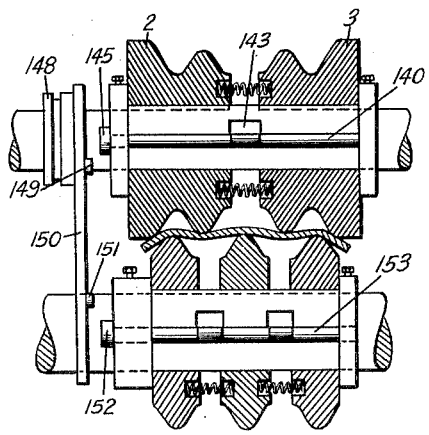
Figure 32 is a vertical sectional view, showing the position of the various parts of our apparatus during the operation of initially grooving the plate.
Figure 33:
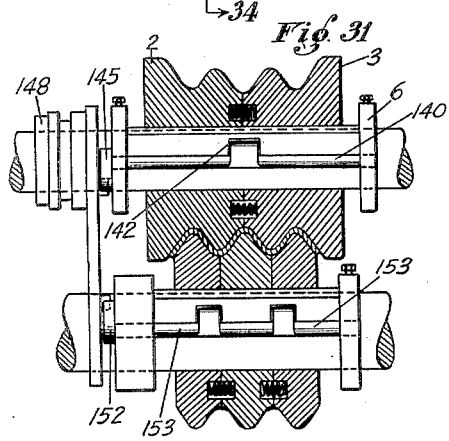
Figure 33 is a vertical sectional view showing the position of the roll sections, and the notched rods during final corrugation of the metal.
Figure 34:
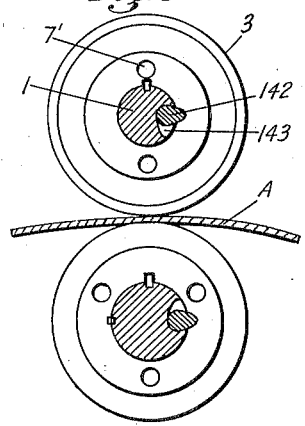
Figure 34 is a section taken on the line 34—34 of Figure 31.
Figure 35:
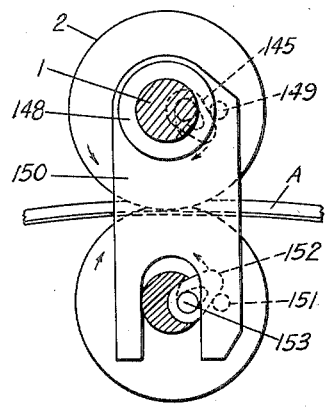
Figure 35 is an end view of the apparatus shown in Fig. 31 to 34 inclusive.
Figure 36:
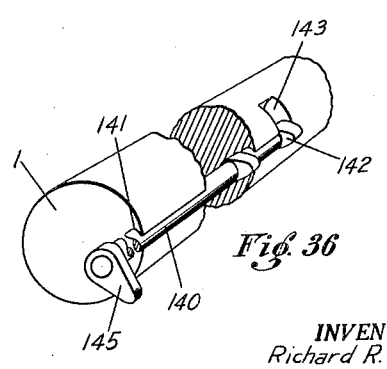
Figure 36 is a detail in perspective of a portion of the lower shaft showing one of the notched rods positioned therein.

In operation, when the collar 114 is moved to the left, Figure 28, the bolt members 110 will be moved down out of engagement with the roll sections by the action of the tongue in the groove 115.

The lower shaft 20, is equipped with the usual roll sections, that, in this instance, are splined to a sleeve 118 fixedly secured to the shaft 20. The two end roll sections are capable of longitudinal movement and the center roll section is fixed. This sleeve is also equipped with longitudinal passageways in which the cam rods 120 are located. The free end of these rods is attached to a slidable collar 130 exactly as described with relation to the upper roll sections. In this instance, the cam rods 120 are provided with two tongues 135, as shown. Each tongue is inclined at an angle and is equipped with a bolt member 110, Figure 30, that is mounted thereon by engagement of the groove 115.

In operation, with the roll sections in the position shown in Figure 26, the outermost ends of the respective bolt members lie intermediate the various roll sections. After initial indentation of the plate, the collars 114 and 130 are moved to the left by any suitable means, which resultantly withdraws the bolt members from engagement with the roll sections and allows them to float on their respective shafts.

With reference to Figures 31 to 36 inclusive, we have shown a still further type of apparatus for preventing longitudinal movement of the two upper roll sections and the two lower end roll sections during initial indentation of the plate.

In this type of apparatus, the two upper roll sections are located by the set collars 6 and are splined to the shaft 1 as hereinbefore set out. We have provided another type of locking means for separating these two roll sections which preferably comprises a rocking shaft 140 that is disposed in a substantially cylindrical groove 141, formed adjacent to the periphery of the shaft 1.

The rocking shaft is further provided with the locking lugs 142 that are formed integrally therewith and extend outwardly therefrom. It can clearly be seen, that rocking of the shaft 140 will throw the locking lugs 142 outwardly beyond the periphery of the shaft or will cause the outer ends thereof to enter the pockets 143 formed in the shaft 1.

The rocking shaft 140 is provided at one end with a lever 145 that is rigidly secured thereto. In order to rotate the shaft 140 to retract the outer ends of the locking lugs from a position intermediate the roll sections 2 and 3, a collar 148 that is slidably mounted on the shaft 1 is moved over toward the roll section, by any suitable means. This action will bring an extension 149, Figures 31 and 35, into such position where it will contact with the lever 145. It will be remembered, that the rocking shaft is movable in a rotary path by the shaft 1 and when the lever 145 strikes the extension 149, the lever 145, Figure 35, will be thrown upwardly to rock the shaft 141 to resultantly throw the outer ends of the lugs 142 into the pocket 143. Thus the outer ends of these lugs will be removed from between the roll sections 2 and 3 and they will be capable of floating longitudinally upon the shaft 1.

With reference to the lower roll sections, the locking structure and the means for operating it is identical with the locking structure mounted on the upper roll section, with the exception that the rocking shaft is provided with two lugs rather than one. These lugs are so disposed on the rocking shaft that they will lie intermediate the inner vertical face of the two end roll sections and the side faces of the fixed center roll section. In operation the lever that is mounted on the end of the rocking shaft is adapted to strike an extension 151 that is formed as a part of a yoke member carried by the collar 148 and movable therewith. The lug will be thrown upwardly, Figure 35, to rock the shaft to resultantly throw the free end of the lugs into the radial pockets. Thus the lower roll sections may be allowed to float along the shaft 20 until such time as they contact.

It will be noted from the foregoing description that we have a method and apparatus wherein the metal to be corrugated is bent into proper form, practically without the stretching action that prevails in prior methods and apparatus. Our rolls are brought together with their sections in spaced fixed relation to produce initial grooves of shallow depth. Then the sections are released and by their movement towards each other complete the formation of the corrugations by a bending action rather than a stretching action. Furthermore, these roll sections are caused to move towards each other by the natural pressure resulting from the moving of the rolls into interfitting relation with the metal disposed therebetween.

Many advantages arise from our novel method and apparatus. For example, it is possible to take an endless band of flat metal and by continuously rolling it to complete a corrugated tube practically without any stretching of the metal whatsoever. This produces a superior product in a shorter length of time. It does away with the necessity for undue handling of the product during its formation. It is evident that there are numerous other advantages, some of which appear from the preceding description.

Having thus described our invention, what we claim is:

1. The method of producing corrugated tubular members which comprises passing a band of metal through opposing pressing rolls formed of sections held in fixed spaced relation to produce an initial groove of incomplete depth, and then releasing sections to permit them to move toward each other during continued passage of the initially grooved band to complete the formation of the corrugations therein.

2. The method of producing corrugated tubular members which comprises passing a band of metal through opposing pressing rolls formed of sections held in fixed spaced relation, and continuously rotating said band therein by the action of said rolls, to produce an initial groove of incomplete depth, and then releasing said roll sections to permit movement thereof toward each other to complete the formation of the grooves.

3. The method of producing corrugated tubular members which comprises continuously rotating a band of metal through opposing pressing rolls, in one direction, to initially form a plurality of grooves of incomplete depth therein, and forming said completed groove by continued rotation of said endless band of metal, after releasing such sections and allowing them to approach each other during a subsequent portion of the rolling operation.

4. In an apparatus for corrugating metal, an upper section, rotatable members splined on said upper sections and held in spaced relation by resilient means, a lower section, a shaft, roll sections mounted on said shaft, one of said roll sections being fixed against axial movement thereon, and the remaining roll sections being free to travel longitudinally with respect thereto.

5. In an apparatus for corrugating steel tug rims, an upper roll, roll sections carried by said roll movable toward and away from each other, a lower roll movable toward and away from said first roll and having a plurality of roll sections mounted thereon, one of said roll sections being fixed against axial movement and the remaining roll sections being free to move toward and away from said fixed roll section.

6. In a corrugating apparatus, an upper shaft, roll sections mounted on said upper shaft, a lower shaft, roll sections disposed on said shaft, one of said roll sections being fixed against axial movement, and the remaining roll sections being held against axial movement by a means mounted in said shaft capable of being operated to release the said roll sections when said upper shaft approaches said lower shaft.

7. In an apparatus for corrugating metal, an upper roll, a shaft, roll sections disposed on said shaft, said roll sections being located by set collars and spaced apart by resilient means, a lower roll, a shaft, roll sections disposed on said shaft, one of said roll sections being fixed against axial movement with respect thereto, the remaining roll sections being prevented from axial movement thereon by a means movable into said path of axial movement, and capable of being withdrawn therefrom.

8. In an apparatus for forming corrugated tug rims, a plurality of roll sections, a shaft on which said roll sections are mounted, and means for preventing longitudinal movement of said roll sections on said shaft, said means being operable to release said roll sections to allow free movement thereof on said shaft.

9. The method of forming corrugated metal tug rims which comprises initially indenting the blank to form shallow grooves in the periphery thereof and simultaneously turning the marginal edges thereof at an angle and preventing axial displacement of the plate, subsequently increasing the depth of said grooves and increasing the angle of said marginal edges by bending the metal plate over a plurality of ribs formed on a plurality of roll sections, said roll sections being free to move closer together as the depth of the grooves is increased.

10. An apparatus for forming corrugated plates comprising an upper shaft, roll sections disposed on said shaft and located by set collars and spaced apart resiliently, cam members mounted on said shaft, a second shaft movable toward and away from said first named shaft, roll sections mounted on said second named shaft, one of said roll sections being fixed against axial movement, the remaining roll sections being prevented from longitudinal movement on said shaft by a plurality of elements movable into and out of the path of longitudinal travel of said roll sections, said elements being movable out of said path by a cam member cooperating with said first named cam member when said shafts are moved toward each other, and a resilient means for returning said elements into the path of travel of said roll sections when said shafts are moved away from each other.

11. In an apparatus for forming corrugating metal tug rims, an upper shaft section, rolls carried by said sections, a lower shaft section, longitudinally movable rolls mounted on said lower shaft, and a plurality of keys disposed in grooves in said shaft for preventing longitudinal movement of said rolls, said keys being movable to release said rolls to allow longitudinal movement thereof.

12. In combination, an apparatus for forming corrugated metal tug rims, a lower shaft, keys mounted in grooves in said shaft, said keys being pivotally connected to said shaft and having upstanding lugs formed on the body portion thereof, one of said lugs being tapered for engagement with a traversable member mounted on said shaft.

In testimony whereof we, hereby affix our signatures.

RICHARD R. BLOSS.
ROY C. PFEIL.